United States Patent
Fujishiro et al.

(10) Patent No.: US 7,818,111 B2
(45) Date of Patent: Oct. 19, 2010

(54) MOTOR CONTROL APPARATUS AND MOTOR CONTROL METHOD

(75) Inventors: Naoki Fujishiro, Kawachi-gun (JP); Hirofumi Atarashi, Shioya-gun (JP); Masashi Tanaka, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 576 days.

(21) Appl. No.: 11/882,913

(22) Filed: Aug. 7, 2007

(65) Prior Publication Data
US 2008/0040015 A1    Feb. 14, 2008

(30) Foreign Application Priority Data
Aug. 9, 2006 (JP) .............................. 2006-217037

(51) Int. Cl.
*G06F 19/00* (2006.01)
(52) U.S. Cl. ............................ 701/99; 701/22; 701/54; 701/112; 310/114; 310/156.07; 310/216.074; 310/156.36; 310/156.35; 318/400.02; 318/400.3; 318/437; 318/432; 318/730
(58) Field of Classification Search .................... 701/22, 701/54, 99, 112; 318/400.02, 400.3, 437, 318/730, 801, 496, 494; 310/114, 156.07, 310/216.074, 156.36, 156.35
See application file for complete search history.

(56) References Cited

U.S. PATENT DOCUMENTS 4,305,031 A    12/1981  Wharton
5,245,238 A     9/1993  Lynch et al.
6,563,246 B1 *  5/2003  Kajiura et al. ............. 310/162
2006/0106524 A1 * 5/2006  Schmitz et al. ............ 701/112

FOREIGN PATENT DOCUMENTS

| JP | 2001-69609    |        | 3/2001  |
| JP | 2002-262534 A |        | 9/2002  |
| JP | 2003-299281 A |        | 10/2003 |
| JP | 2004-064942 A |        | 2/2004  |
| JP | 2004-072978 A |        | 3/2004  |

* cited by examiner

*Primary Examiner*—Tuan C To
*Assistant Examiner*—Redhwan Mawari
(74) *Attorney, Agent, or Firm*—Arent Fox LLP

(57) ABSTRACT

This motor control apparatus is provided with: a reduced energy calculation device that calculates a reduced energy that is produced when a drive mode of a hybrid vehicle is shifted from a drive mode driven by a motor to a drive mode driven by an internal combustion engine and if the phase of the motor is changed from the present phase to the arbitrary required phase; a displacement energy calculation device that calculates a displacement energy that is produced when the present phase is changed to the arbitrary required phase; and a phase change permission device that compares the reduced energy and the displacement energy, and permits changing from the present phase to the required phase when it is determined that the reduced energy is greater than the displacement energy.

2 Claims, 8 Drawing Sheets

MOTOR CONTROL APPARATUS AND MOTOR CONTROL METHOD

Priority is claimed on Japanese Patent Application No. 2006-217037, filed on Aug. 9, 2006, the content of which is incorporated herein by reference.

BACKGROUND OF THE INVENTION

1. Field of the Invention

The present invention relates to a motor control apparatus and a motor control method.

2. Description of the Related Art

Conventionally, in a motor of a vehicle such as a hybrid vehicle, a plurality of rotors provided with magnetic poles of alternately reversed polarity in the rotational direction have been disposed adjacent to each other on the same rotating shaft. It is well known that the induced voltage constant of a permanent magnet opposed to a stator is adjusted with an actuator by varying the distance of those rotors (for example, refer to Japanese Unexamined Patent Application, First Publication No. 2001-69609).

In a motor control apparatus that controls the motor based on the prior art mentioned above, the efficiency of the motor is improved by employing various methods aiming for energy conservation during a drive mode. However, in the motor as mentioned above, wherein the induced voltage constant can be adjusted, even if the vehicle is not in a drive mode, energy is consumed by actuator and the like even for maintaining the position of the rotors. Therefore, energy conservation of a motor at periods other than a drive mode period is demanded in recent years. The present invention considers the circumstances mentioned above, and has an object of providing a motor control apparatus and a motor control method, that can achieve energy conservation of the motor even at periods other than the drive mode period.

SUMMARY OF THE INVENTION

In order to achieve the above-described object, the present invention employs the followings.

Namely, the present invention employs a motor control apparatus provided in a hybrid vehicle that has a motor and a phase changing device, and is driven by at least the motor or an internal combustion engine, the motor including a plurality of rotors each having a magnet piece, and the phase changing device changing a relative phase of each of the rotors by a fluid pressure of a working fluid. The motor control apparatus is provided with: a reduced energy calculation device that calculates a reduced energy that is produced when a drive mode of the hybrid vehicle is shifted from a drive mode driven by the motor to a drive mode driven only by the internal combustion engine and if the phase of the motor is changed from a present phase to an arbitrary required phase; a displacement energy calculation device that calculates a displacement energy that is produced when the present phase is changed to the arbitrary required phase; and a phase change permission device that compares the reduced energy and the displacement energy, and permits changing from the present phase to the required phase when it is determined that the reduced energy is greater than the displacement energy.

According to the motor control apparatus, when changing over from the drive mode driven by the motor to the drive mode driven only by the internal combustion engine, the reduced energy calculation device calculates the reduced energy that is produced when the current phase is changed to the required phase, and at the same time, the displacement energy calculation device the displacement energy required for changing the present phase to the required phase is calculated. The phase change permission device compares the reduced energy with the displacement energy, and only when the reduced energy is greater than the displacement energy (that is, the consumed energy can be reduced if the present phase position is changed), permits changing the phase position. As a result, energy savings can be achieved during motor standby.

It may be arranged such that the reduced energy calculation device calculates the reduced energy based on a difference between a maintenance energy required for maintaining the phase of the motor in the present phase and a maintenance energy required for maintaining the phase of the motor in the arbitrary required phase.

In this case, for example, by subtracting the maintenance energy required for maintaining the phase of the motor at the arbitrary required phase from the maintenance energy required for maintaining the present phase of the motor, the reduced energy, which is the reduced part of the maintenance energy due to the change in phase, can be calculated. As a result, the consumed energy at motor standby is easily and quickly inhibited, and fuel consumption of the hybrid vehicle can be improved.

In addition, the present invention also employs a motor control method for a hybrid vehicle that has a motor and a phase changing device, and is driven by at least the motor or an internal combustion engine, the motor including a plurality of rotors each having a magnet piece, and the phase changing device changing a relative phase of each of the rotors by a fluid pressure of a working fluid. The motor control method includes: a reduced energy calculation process of calculating a reduced energy that is produced when a drive mode of the hybrid vehicle is shifted from a drive mode driven by the motor to a drive mode driven only by the internal combustion engine and if the phase of the motor is changed from a present phase to an arbitrary required phase; a displacement energy calculation process of calculating a displacement energy that is produced when the present phase is changed to the arbitrary required phase; and a phase change permission process of comparing the reduced energy and the displacement energy, and permitting changing from the present phase to the required phase when it is determined that the reduced energy is greater than the displacement energy.

According to the motor control method mentioned above, similar to the case when the motor control apparatus mentioned above is used, energy savings at motor standby can be achieved.

It may be arranged such that the reduced energy calculation process calculates the reduced energy based on a difference between a maintenance energy required for maintaining the phase of the motor in the present phase and a maintenance energy required for maintaining the phase of the motor in the arbitrary required phase.

In this case, similar to the case when the motor control apparatus above is used, the consumed energy at motor standby is easily and quickly inhibited, and fuel consumption of a hybrid vehicle can be improved.

DETAILED DESCRIPTION OF THE INVENTION

A motor control apparatus and a motor control method according to an embodiment of the present invention will be described below with reference to the drawings.

Figure 1:
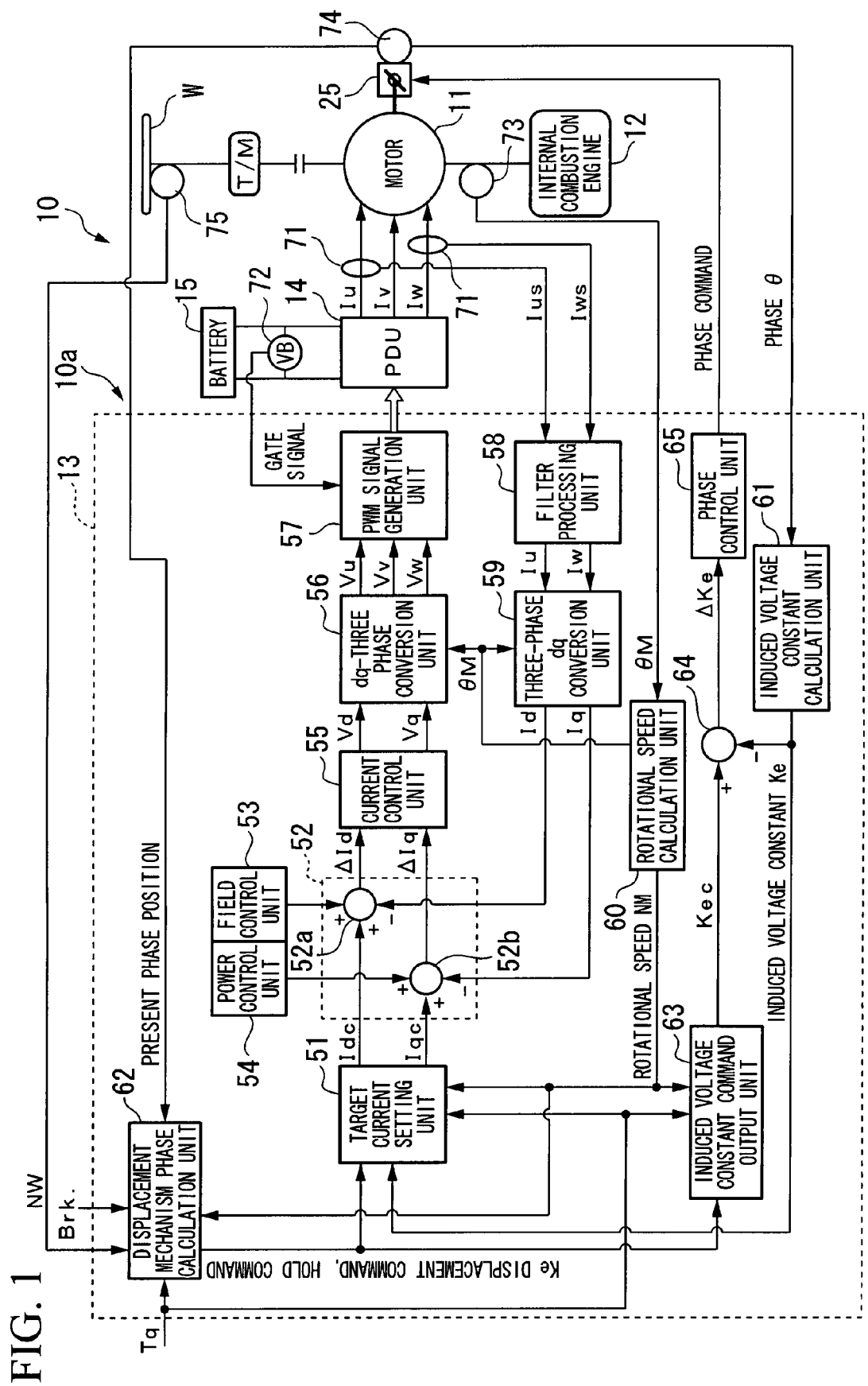
FIG. 1 shows a configuration of a motor control apparatus according to an embodiment of the present invention.

The motor control apparatus according to the present embodiment is equipped in a hybrid vehicle provided with a motor as a drive source for traveling the hybrid vehicle. The vehicle 10 shown in FIG. 1 is a parallel hybrid vehicle provided with a motor 11 and an internal combustion engine 12 as the drive sources. The motor 11, the internal combustion engine 12 and the transmission unit T/M are directly connected, with at least either the drive force of the motor 11 or the internal combustion engine 12 being transmitted to the drive wheel W of the vehicle 10 through the transmission unit T/M.

When the drive force is transmitted to the motor 11 from the drive wheel W side during deceleration of the vehicle 10, the motor 11 functions as a generator, which generates the so-called regenerative braking force. As a result, the kinetic energy of the vehicle body is recovered as electric energy (regenerated energy). Even when the output of the internal combustion engine 12 is transmitted to the motor 11, the motor 11 acts as a generator and generates electric power.

In this vehicle 10, the drive and the regenerative action of the motor 11 having a plurality of phases (for example, three-phases of phase U, phase V, and phase W) are performed by the power drive unit (PDU) 14 that receives control commands output by the control unit 13.

The PDU 14 is provided with a PWM inverter, and is connected to the motor 11 and the high voltage battery 15 that receives electric energy from the motor 11 and delivers electric energy to the motor 11. The PWM inverter is provided with a bridge circuit formed by bridge connection of switching elements of a plurality of transistors, with which pulse width modulation (PWM) is performed.

For example, during the drive mode driven by the motor 11, the PDU 14 converts DC power supplied by the battery 15 to three-phase alternating current power by changing over the ON (pass through)/OFF (cut-off) status of each transistor in a pair in each phase in the PWM inverter, based on the gate signal (that is, PWM signal), which is the switching command input from the control unit 13. Subsequently, the PDU 14 conducts alternating current, that is, U phase current Iu and V phase current Iv and W phase current Iw to each phase of the stator winding by sequentially commutating the current to the three-phase stator winding in the motor 11.

Figure 2:
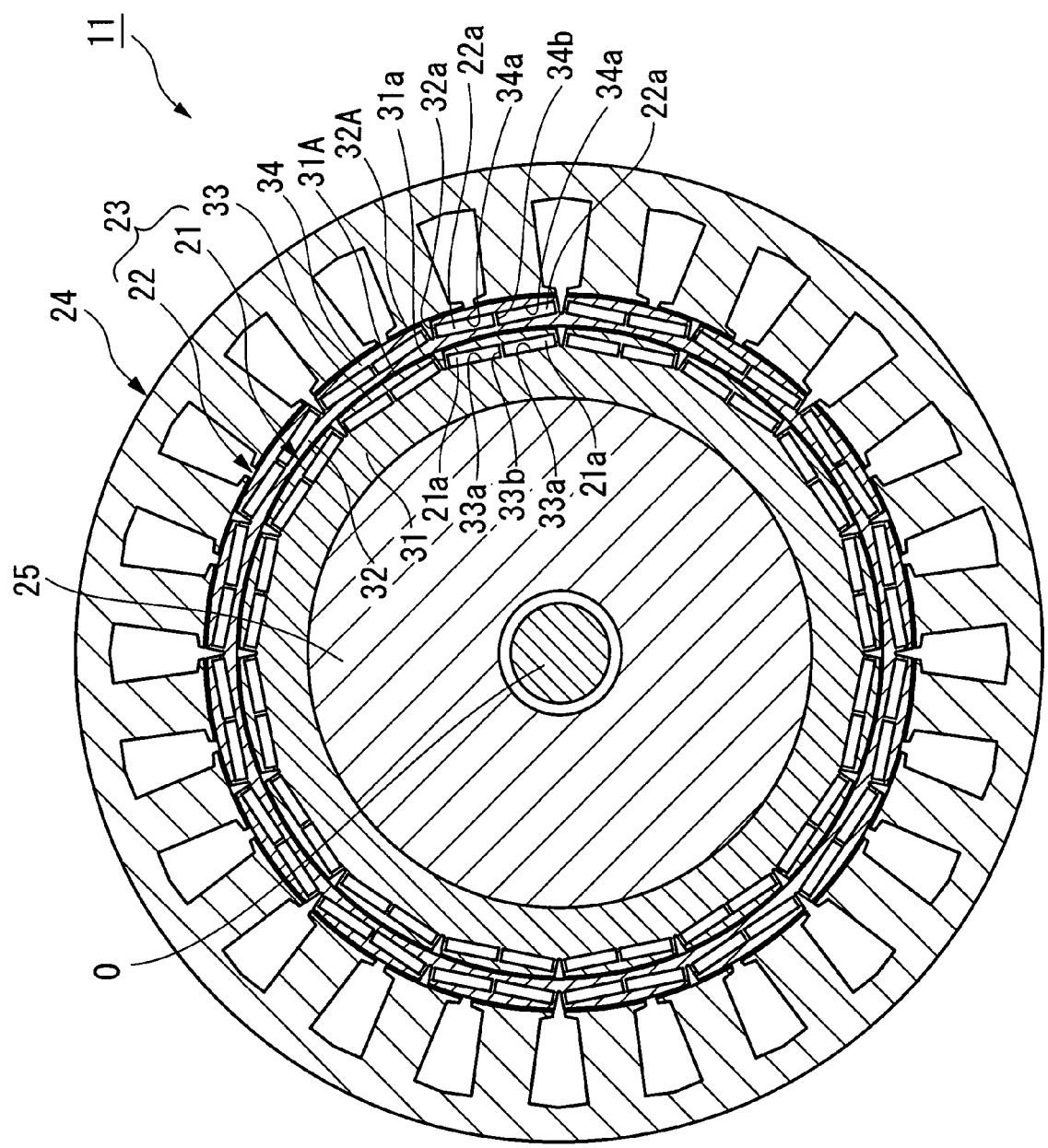
FIG. 2 is a schematic cross-sectional view of the motor.

For example, as shown in FIG. 2, the motor 11 may include a rotor 23, made of a rotor at the inner periphery 21 and a rotor at the outer periphery 22 in substantially circular shape provided with permanent magnets (magnet pieces) 21a, 22a disposed along the circumferential direction, a stator 24 having stator coils (not illustrated) of a plurality of phases that generates rotating magnetic field to rotate the rotor 23, and a phase control apparatus 25 that controls the relative phase between the rotor at the inner periphery 21 and the rotor at the outer periphery 22. This phase control apparatus 25, changes the relative phase between the rotor at the inner periphery 21 and the rotor at the outer periphery 22 using, for example, hydraulic pressure.

The rotor at the inner periphery 21 and the rotor at the outer periphery 22 are disposed such that the axis of rotation of each rotor is the same as the axis of rotation O of the motor 11. The rotor at the inner periphery 21 is provided with a substantially cylindrical shaped rotor core 31, and a plurality of inner peripheral magnet mounting attachments 33, . . . 33 installed at the specified spacing in the circumferential direction on the outer periphery of the first rotor core 31. The rotor at the outer periphery 22 is provided with a substantially cylindrical shaped rotor core 32, and a plurality of outer peripheral magnet mounting attachments 34, . . . 34 installed at the specified spacing in the circumferential direction on the inside of the second rotor core 32.

A groove 31a is formed extending parallel to the axis of rotation O on the outer peripheral surface 31A of the first rotor core 31 and lying between adjacent inner peripheral magnet mounting attachments 33, 33 in the circumferential direction.

A groove 32a is also formed extending parallel to the axis of rotation O on the outer peripheral surface 32A of the second rotor core 32 and lying between adjacent outer peripheral magnet mounting attachments 34, 34 in the circumferential direction.

Each magnet mounting attachment 33 and 34 is provided with a pair of magnet attachment holes 33a, 33a and 34a, 34a respectively passing through and parallel to the axis of rotation O. A pair of magnet attachment holes 33a, 33a is disposed so as to be adjacent to each other being separated by the center rib 33b in the circumferential direction. Another pair of magnet attachment holes 34a, 34a is disposed so as to be adjacent to each other being separated by the center rib 34b in the circumferential direction.

Each magnet attachment hole 33a and 34a is formed in a substantially rectangular shape with the long side being oriented in the circumferential direction of the cross section perpendicular to the axis of rotation O. Permanent magnets 21a, 22a of substantially rectangular plate form extending parallel to the axis of rotation are provided in each of these magnet attachment holes 33a, 34a.

One pair of inner peripheral permanent magnets 21a, 21a mounted in one pair of the magnet attachment holes 33a, 33a are magnetized in the thickness direction (that is, in the radial direction of each rotor 21, 22), and are set such that the magnetization direction is mutually same. The magnetization directions of the adjacent inner peripheral magnet mounting attachments 33, 33 in the circumferential direction are set to be mutually different. That is, the inner peripheral magnet mounting attachment 33 provided with a pair of inner peripheral permanent magnets 21a, 21a magnetized so that the outer periphery becomes the N pole, is set adjacent in the circumferential direction to the inner peripheral magnet mounting attachment 33 provided with a pair of inner peripheral permanent magnets 21a, 21a and magnetized so that the outer periphery becomes the S pole, separated by the groove 31a.

Similarly, one pair of outer peripheral permanent magnets 22a, 22a mounted in one pair of the magnet attachment holes 34a, 34a are magnetized in the thickness direction (that is, in the radial direction of each rotor 21, 22), and are set such that the magnetization direction becomes mutually the same. The magnetization directions of the adjacent outer peripheral magnet mounting attachments 34, 34 in the circumferential direction are set so as to be mutually different. That is, the outer peripheral magnet mounting attachment 34 provided with the pair of outer peripheral permanent magnets 22a, 22a, magnetized so that the outer periphery becomes the N pole, is set adjacent in the circumferential direction to the outer peripheral magnet mounting attachment 34 provided with the pair of outer peripheral permanent magnets 22a, 22a and magnetized so that the outer periphery becomes the S pole, separated by the groove 32a.

The magnet mounting attachments 33, . . . , 33 of the rotor at the inner periphery 21, and the magnet mounting attachments 34, . . . , 34 of the rotor at the outer periphery 22 are disposed so as to be opposite to each other in the radial direction of the rotor 21 (22). Moreover, the grooves 31a, . . . , 31a of the rotor at the inner periphery 21, and the grooves 32a, . . . , 32a of the rotor at the outer periphery 22 are disposed so as to be opposite to each other in the radial direction of the rotor 21 (22).

As a result, the state of the motor 11 can be set to an appropriate state in the range from the field weakening state wherein the like magnetic poles of the inner peripheral permanent magnet 21a and the outer peripheral permanent magnet 22a face each other (that is, the poles of the inner peripheral permanent magnet 21a and the outer peripheral permanent magnet 22a are disposed in a like-pole facing arrangement) to the field strengthening state wherein the unlike magnetic poles of the inner peripheral permanent magnet 21a and the outer peripheral permanent magnet 22a face each other (that is, the poles of the inner peripheral permanent magnet 21a and the poles of the outer peripheral permanent magnet 22a are disposed in an unlike-pole facing arrangement).

Figure 3A:
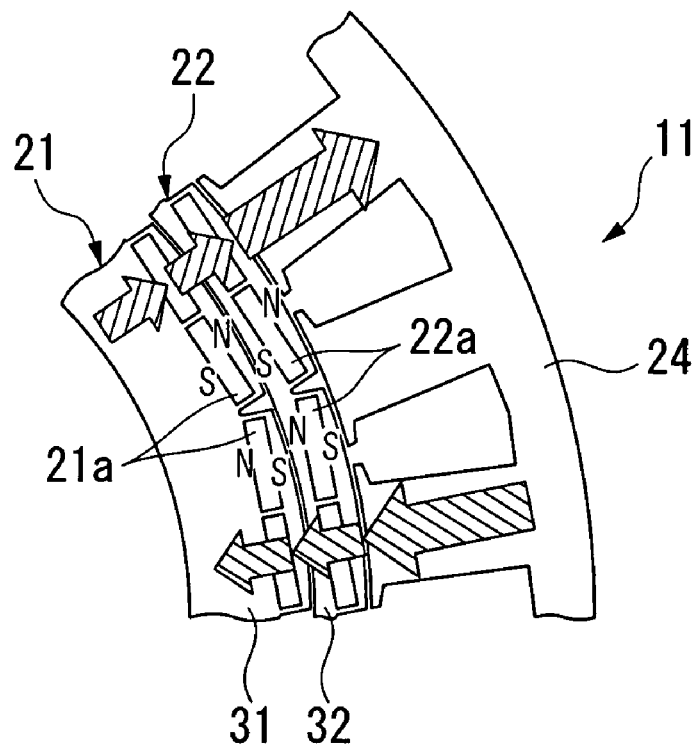
FIG. 3A is a cross-sectional view showing schematically the field strengthening state wherein permanent magnets of a rotor at the inner periphery and permanent magnets of the rotor at the outer periphery of the motor are disposed in an unlike-pole facing arrangement.
Figure 3B:
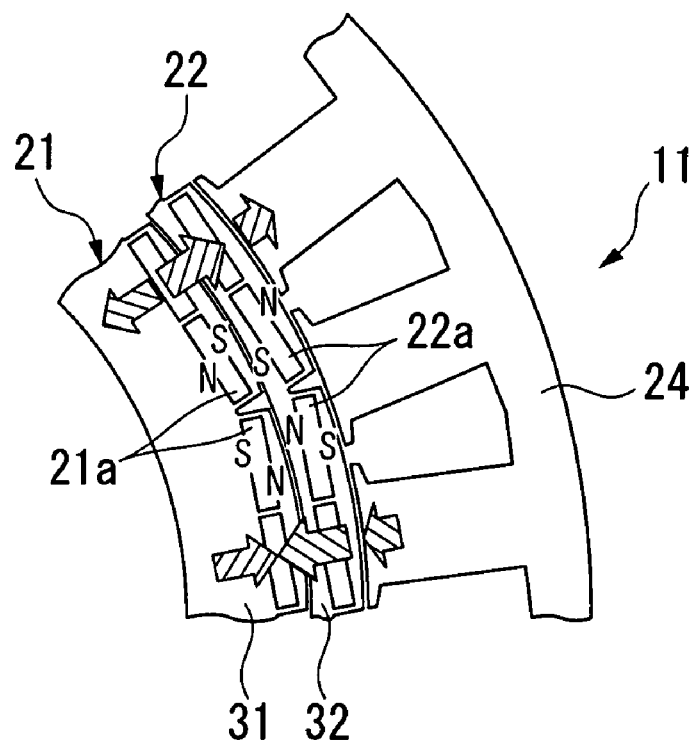
FIG. 3B is a cross-sectional view showing schematically the field weakening state wherein the permanent magnets of the rotor at the inner periphery and the permanent magnets of the rotor at the outer periphery of the motor are disposed in a like-pole facing arrangement.

Here, the motor 11 changes to the field strengthening state (as shown in FIG. 3A) wherein the unlike poles of the inner peripheral permanent magnet 21a and the outer peripheral permanent magnet 22a are disposed to face each other, when the rotor at the inner periphery 21 is in the maximum lag angle position with respect to the rotor at the outer periphery 22. Also, when the rotor at the inner periphery 21 is in the maximum advance angle position with respect to the rotor at the outer periphery 22, the like poles of the inner peripheral permanent magnet 21a and the outer peripheral permanent magnet 22b are set so as obtain the field weakening state (see FIG. 3B) wherein the like poles are disposed to face each other.

This motor 11 can be changed to an arbitrary state between the field strengthening state and the field weakening state by controlling the supply and discharge of hydraulic fluid. If the magnetic field strength is changed in this manner, the induced voltage constant Ke changes accordingly, and as a result, the characteristics of the motor 11 can be varied. That is, when the induced voltage constant Ke increases due to the field strengthening, although the permissible rotational speed at which the motor 11 can be operated decreases, the maximum torque that can be output increases. Conversely, when the induced voltage constant decreases due to the field weakening, although the maximum torque that can be output by the motor 11 decreases, the permissible rotational speed increases.

As shown in FIG. 1, the control unit 13 performs the feedback control of electric current on the dq coordinate that forms the rotating orthogonal coordinate system. For instance, the d axis current command Idc and the q axis current command Iqc are calculated based on the torque command value Tq set based on the results measured by the accelerator opening sensor for measuring the accelerator opening related to accelerator operation by the driver. Next, each phase output voltage Vu, Vv, Vw is calculated based on the d axis current command Idc and the q axis current command Iqc; and the PWM signal is input, which is the gate signal to the PDU 14 corresponding to each phase output voltage Vu, Vv, Vw. Moreover, controls are performed such that each of the difference between the d axis current Id and the d axis current command Idc and the difference between the q axis current Iq and the q axis current command Iqc becomes zero, in which the Id and Iq are obtained after converting any two of the phase currents from the phase currents Iu, Iv, Iw, practically supplied to the motor 11 from PDU 14, to currents on the dq coordinates.

This control unit 13 may be provided with, for example, a target current setting unit 51, current difference calculation unit 52, a field control unit 53, a power control unit 54, a current control unit 55, a dq-three phase conversion unit 56, a PWM signal generation unit 57, a filter processing unit 58, a three-phase dq conversion unit 59, an rotational speed calculation unit 60, an induced voltage constant calculation unit 61, a displacement mechanism phase calculation unit 62, an induced voltage constant command output unit 63, an induced voltage constant difference calculation unit 64, and a phase control unit 65.

Each measured signal Ius, Iws output by each current sensor 71, 71 that measures the U phase current Iu and the W phase current Iw from each phase current Iu, Iv, Iw output to the motor 11 by PDU 14, the measured signals output by the voltage sensor 72 that measures the terminal voltage (power supply voltage) VB of the battery 15, the measured signals output by the rotation sensor 73 that measures the angle of rotation θM (that is, the angle of rotation of the magnetic pole of the rotor from a specified reference rotation position) of the rotor of the motor 11, the measured signals output by the phase sensor 74 that measures the relative phase θ between the rotor at the inner periphery 21 and the rotor and the outer periphery 22, which are variably controlled by the phase control apparatus 25, and the measured signals output by a plurality of wheel speed sensors 75, . . . , 75 that measure the rotational speed (wheel speed NW) of each wheel of the vehicle 10, are input to this control unit 13.

The target current setting unit 51 calculates the current command values for specifying each phase current Iu, Iv, Iw supplied to the motor 11 by the PDU 14, based on the torque command value Tq input from an external control apparatus (not illustrated) (for example, the command value for generating in the motor 11 the required torque corresponding to the output of the accelerator opening sensor that measures the amount the accelerator pedal AP has been depressed by the driver), the rotational speed NM of the motor 11 input from the rotational speed calculation unit 60, and the induced voltage constant Ke input from the induced voltage constant calculation unit 61 described later. This current command is output to the current difference calculation unit 52 as the d axis current command Idc and the q axis current command Iqc on the rotating orthogonal coordinate system.

The dq coordinate that forms the rotating orthogonal coordinate system, takes the direction of magnetic flux of the field pole due to permanent magnets of the rotor as the d axis (field axis), and the direction perpendicular to this d axis as the q axis (torque axis), and rotates synchronously with the rotation phase of the rotor 23 of the motor 11. As a result, the d axis current command Idc and the q axis current command Iqc, which are direct current signals, are assigned as current commands for alternating current signals supplied to each phase of the motor 11 from PDU 14.

The current difference calculation unit 52 is provided with the d axis current difference calculation unit 52a that calculate the difference ΔId between d axis current Id and d axis current command Idc to which the d axis compensation current has been added and which is input from the field control unit 53, and the q axis current difference calculation unit 52b that calculate the difference ΔIq between q axis current Iq and q axis current command Iqc to which the d axis compensation current has been added and which is input from the field control unit 54.

The field control unit 53 outputs a targeted value of field weakening current as the d axis compensation current to the d axis current difference calculation unit 52a, in which the field weakening current is set in field weakening control that controls the current phase to weaken the field of the rotor 23 so as to inhibit the increase in the back electromotive force accompanying the increase in the rotational speed NM of the motor 11.

Also, the power control unit 54 outputs the q axis compensation current for compensating the q axis current command Iqc to the q axis current difference calculation unit 52a, by appropriate power controls corresponding to the residual capacity and the like of the battery 15.

The current control unit 55 calculates the d axis voltage command value Vd after control amplification of the difference ΔId by, for example, PI (proportional integration) action corresponding to the rotational speed NM of the motor 11; and it performs control amplification of the difference ΔId and calculates the q axis voltage command value Vq. The dq-three phase conversion unit 56 converts the d axis voltage command value Vd and the q axis voltage command value Vq on the dq coordinate to the U-phase output voltage Vu, the V-phase output voltage Vv and the W-phase output voltage Vw, which are voltage command values on the three-phase alternating current coordinates which are static coordinates, using the angle of rotation θM of the rotor 23 input from the rotational speed calculation unit 60.

The PWM signal generation unit 57 generates the gate signal (that is, PWM signal), which is a switching command, made of various pulses that implement ON/OFF drive of each switching element of the PWM inverter of PDU 14, by pulse width modulation based on, for example, each phase output voltage Vu, Vv, Vw in sinusoidal shape, carrier signal formed from triangular waves, and switching frequency.

The filter processing unit 58 performs filter processing such as removal of high frequency components for the measured signals Ius, Iws that are corresponding to each phase current measured by each current sensor 71, 71, and extracts each phase current Iu, Iw as physical quantity.

The three-phase dq conversion unit 59 calculates the d axis current Id and the q axis current Iq due to the rotation phase of the motor 11, on the dq coordinate which is the rotational coordinate, using each phase current Iu, Iw extracted by the filter processing unit 58, and the angle of rotation θM of the rotor 23 input by the rotational speed calculation unit 60.

The rotational speed calculation unit 60 extracts the angle of rotation θM of the rotor 23 of the motor 11 from the measured signal output from the rotation sensor 73, and based on this angle of rotation θM, calculates the rotational speed NM of the motor 11.

The induced voltage constant calculation unit 61 calculates the induced voltage constant Ke corresponding to the relative phase θ between the rotor at the inner periphery 21 and the rotor at the outer periphery 22, based on the measured signal of the phase θ output by the phase sensor 74.

The induced voltage constant command output unit 63 outputs the command value (induced voltage constant command value) Kec corresponding to the induced voltage constant Ke of the motor 11, based on, for example, the torque command value Tq, and the rotational speed NM of the motor 11.

The induced voltage constant difference calculation unit 64 outputs the induced voltage constant difference ΔKe, which is the difference between the induced voltage constant command value Kec output by the induced voltage constant command output unit 63 and the induced voltage constant Ke output by the induced voltage constant calculation unit 61.

The phase control unit 65 outputs the control command for controlling the phase θ such that, for example, the induced voltage constant difference ΔKe becomes zero.

Incidentally, the control unit 13 is provided with a displacement mechanism phase calculation unit 62 for controlling the standby energy of the motor 11 to a minimum value, when moving from the drive mode driven by the motor 11 to the drive mode driven only by the internal combustion engine 12. This displacement mechanism phase calculation unit 62 outputs to the induced voltage constant command output unit the control command of induced voltage constant Ke, so as to keep the motor 11 to stay in the phase θ or the phase θh, whichever the standby consumed energy is lower, in which the phase θ is the present phase at the point of shift to drive mode driven only by the internal combustion engine 12 and the phase θh is the required phase (arbitrary required phase) when the drive with the motor 11 is restored.

More specifically, the displacement mechanism phase calculation unit 62 is provided with a map of the phase position, rotational speed and maintenance energy in the motor 11, and it retrieves the maintenance energy at the present phase θ, based on the phase θ output by the phase sensor 74 and the rotational speed NM output by the rotational speed calculation unit 60. The maintenance energy at the phase θh is retrieved based on the rotational speed NM and the phase θh, at the inception of the change in phase position from phase θ to phase θh. Here, this maintenance energy refers to the energy required for maintaining the relative phase of the rotor at the inner periphery 21 and the rotor at the outer periphery 22. More specifically, it becomes the energy for maintaining the relative position of the rotor at the inner periphery 21 and the rotor at the outer periphery 22 by activating hydraulic pressure with a pump (not illustrated). That is, the maintenance energy in this embodiment is mainly the drive energy of the pump.

Furthermore, the displacement mechanism phase calculation unit 62 calculates the reduced energy which is produced due to the phase change, by subtracting the maintenance energy at the retrieved phase θh from the maintenance energy at the retrieved phase θ.

The displacement mechanism phase calculation unit 62 is provided with a map of the present phase θ, the phase θh, and displacement energy. The phase θh may be calculated based on the accelerator pedal opening, which is the driver's request. Using the phase θ and the phase θh, the displacement energy consumed by the phase control apparatus 25 is found when changing over from the present phase θ to the phase θh.

The displacement mechanism phase calculation unit 62 compares the reduced energy and the displacement energy mentioned above, and only when the reduced energy is greater, outputs the control signal allowing phase change from the phase θ to the phase θh. That is, the displacement mechanism phase calculation unit 62 outputs the induced voltage constant (Ke) displacement command allowing the phase change to the phase θh when a change made to the phase θh is expected to reduce the overall consumed energy at standby, to the target current setting unit 51 and to the induced voltage constant command output unit 63. On the other hand, when the consumed energy mentioned above is not expected to be reduced, it outputs the hold command to hold the present phase θ to the target current setting unit 51 and the induced voltage constant command output unit 63.

The motor control apparatus 10a according to the present embodiment is provided with the configuration above. Next, the operation of this motor control apparatus 10a, especially the standby phase control process to control the phase position at standby of the motor 11, will be described below referring to the drawings.

Figure 4:
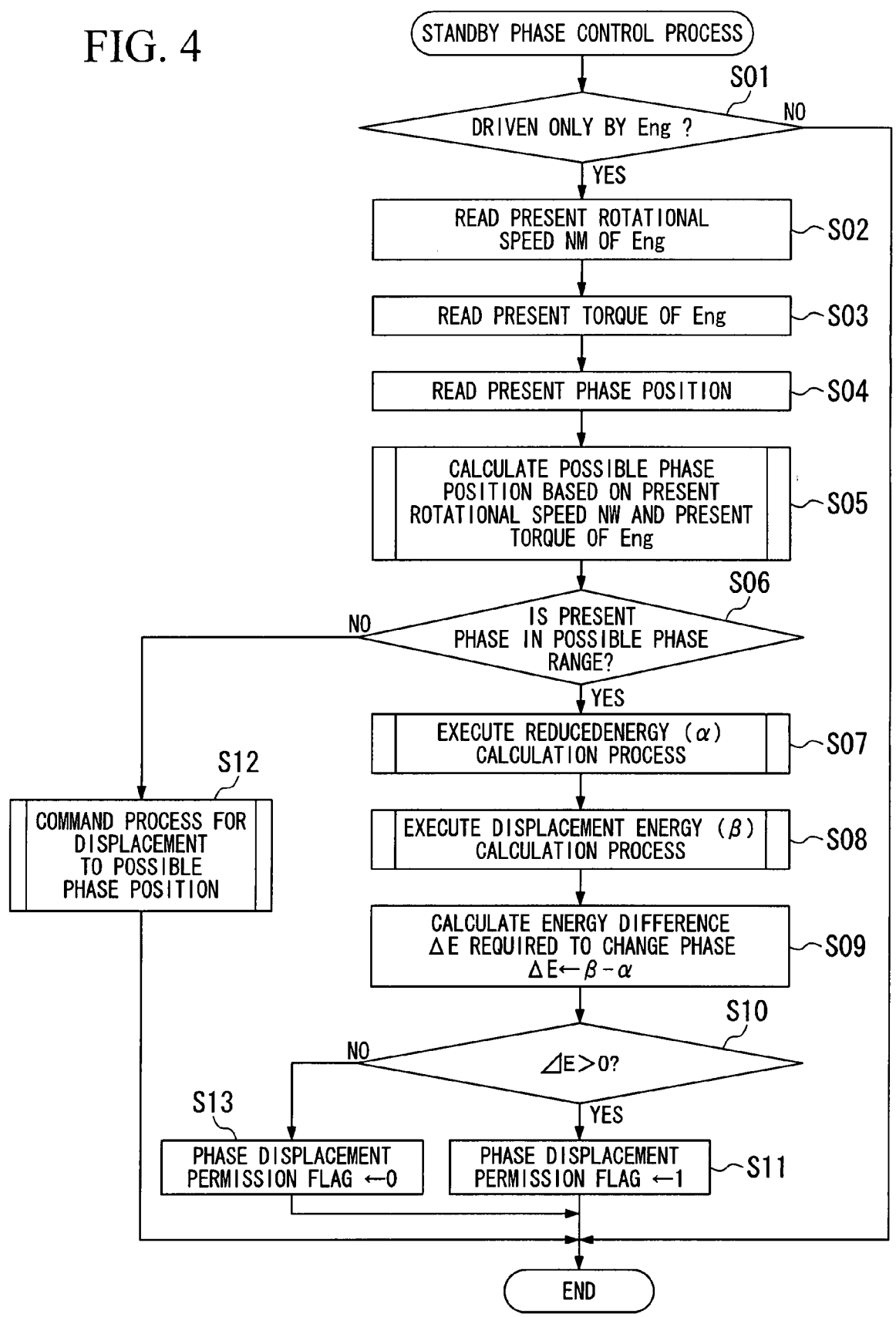
FIG. 4 is a flowchart showing the standby phase control process according to the present embodiment.

First, in step S01 shown in FIG. 4, whether a vehicle is driven with only the internal combustion engine (Eng) 12 or not is determined. If the result determined in the step S01 is "YES," (driven only with Eng), the process goes ahead to S2. If the determined result is "NO," (driven not only with Eng), then this process is terminated.

The rotational speed NM, which is the rotational speed of the internal combustion engine (Eng) 12 output by the rotational speed calculation unit 60 is read in step S02.

In step S03, the present torque of the internal combustion engine 12 is calculated and read based on the vehicle wheel speed NW output by the wheel speed sensor 75.

In step S04, the phase θ, which is the present phase position output by the phase sensor 74, is read.

Figure 7:
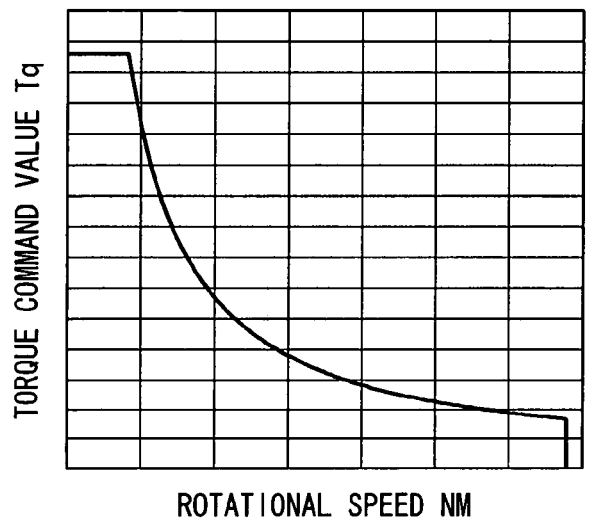
FIG. 7 is a map expressing the relationship between the torque Tq and the rotational speed NM according to the present embodiment.

In step S05, the process of calculating the possible phase position is implemented based on the present rotational speed NM and the present torque of the internal combustion engine 12 read in step S02. That is, as shown in FIG. 7, the phase range which the phase can be changed with the motor 11 is referred to based on the map of the torque command value Tq and the rotational speed NM.

In step S06, the phase θ, which is the present phase position, is checked to confirm whether it lies in the range of the possible phase position referred to in step S5. If the result determined is "YES," (within the range of the possible phase position), the process proceeds to S07. On the other hand, if the determined result is "NO," (not within the range of the possible phase position, then this process proceeds to step S12. The control command to change the phase θ to the possible phase position is output in step S12, and the process is terminated.

In step S07, the reduced energy calculation process mentioned later is implemented, and the reduced energy (α) is calculated.

In step S08, the displacement energy calculation process mentioned later is implemented, and the displacement energy (β) is calculated.

In step S09, by subtracting the reduced energy (α) calculated in step S07 from the displacement energy (β) calculated in step S08, the energy difference ΔE required to change the phase is calculated.

In step S10, the energy difference ΔE is checked to confirm whether it is greater than zero or not. If the result determined in the step S10 is "YES," (ΔE>0), the process proceeds to step S11. If the determined result is "NO," (ΔE≦0), then the process proceeds to step S13. Here, if the energy difference ΔE is a positive value, then the consumed energy reduces when the phase is changed; on the other hand, if the energy difference ΔE is less than zero, then the consumed energy does not reduce when the phase is changed.

In step S11, the phase displacement permission flag is set at "1" and the process is terminated.

In step S12, the displacement command process to the possible phase position is implemented. Here, in step S12, the process to output control command is implemented so as to make the present phase θ not in the variable phase range be within the possible phase range.

In step S13, the phase displacement permission flag is set at "0" and the process is terminated.

Figure 5:
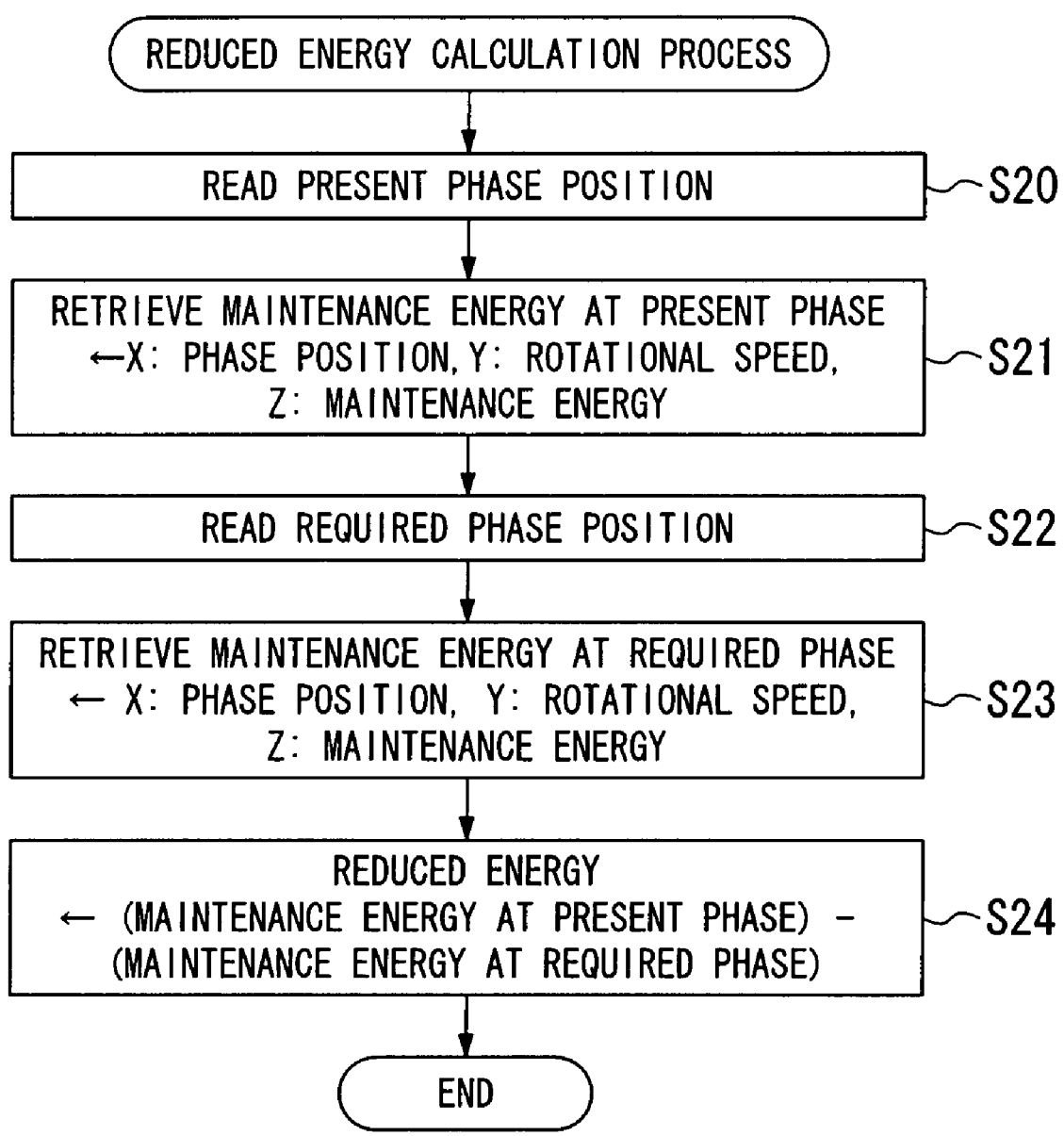
FIG. 5 is a flowchart showing the reduced energy calculation process according to the present embodiment.

Next, the reduced energy calculation process of step S07 above will be explained below based on FIG. 5.

First, in step S20, the phase θ, which is the present phase position, is read.

Figure 8:
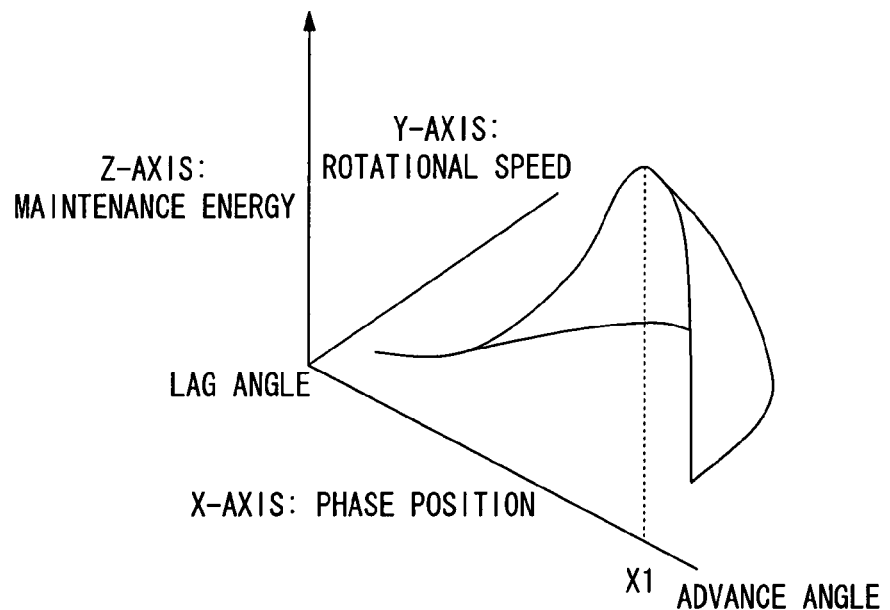
FIG. 8 is a map expressing the relationship between phase position, rotational speed and maintenance energy according to the present embodiment.

In step S21, the three-dimensional map of the phase position (X axis) and rotational speed (Y axis) and maintenance energy (Z axis) shown in FIG. 8 is retrieved, and the maintenance energy at the phase θ, which is the present phase position is found.

Here, the three-dimensional map of the phase position (X axis) and rotational speed (Y axis) and maintenance energy (Z axis) of FIG. 8, is an example of phase change performed by the phase control apparatus 25 through hydraulic pressure control. When the phase position of the X axis is X1, the maintenance energy of the Z axis becomes maximum. With the increase in rotational speed of the Y axis, the centrifugal hydraulic pressure rises in the phase control apparatus 25, and additional hydraulic pressure needed to be applied decreases, so the maintenance energy decreases. On the other hand, when the phase position X1 is near the maximum lag angle or the maximum advance angle, the maintenance energy approaches the value zero. When the phase position is advanced, the reduction rate of the maintenance energy is greater than that when the phase position is delayed.

In step S22, the phase θh, which is the phase position after change, is calculated based on the accelerator pedal opening or the like, and is read.

In step S23, similar to S21, the three-dimensional map of the phase position (X axis), rotational speed (Y axis) and maintenance energy (Z axis) shown in FIG. 8, is retrieved and the maintenance energy at the phase θh is found.

In step 24, by subtracting the maintenance energy of the phase θh (phase after change) from the maintenance energy at the phase θ (present phase), the reduced energy, which is the reduced maintenance energy due to the phase position change is calculated, and this reduced energy calculation process is terminated.

Figure 6:
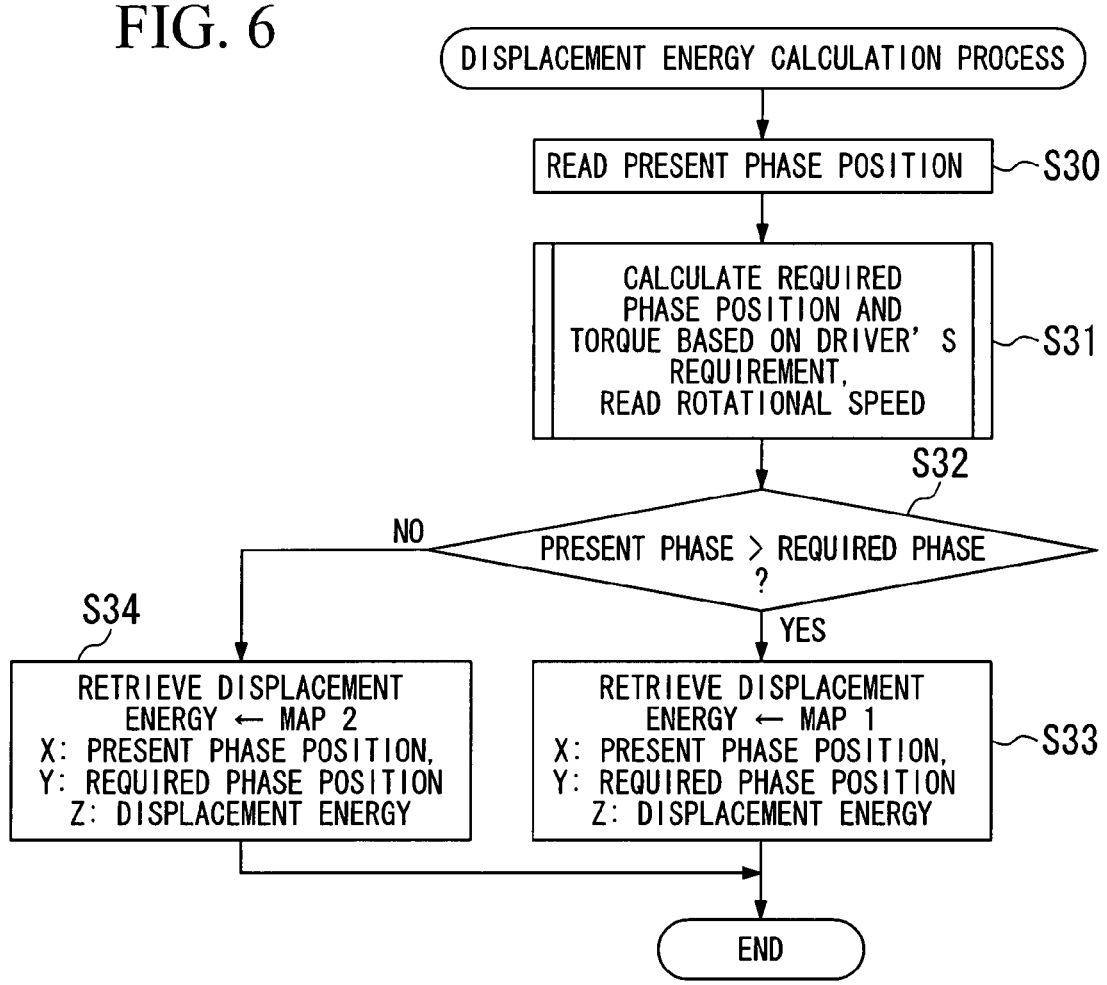
FIG. 6 is a flowchart showing the displacement energy calculation process according to the present embodiment.

Next, the displacement energy calculation process of step S08 above will be explained below based on FIG. 6.

First, in step S30, the phase θ, which is the present phase position, is read. In step S31, the phase θh, which is the required phase position, and the torque command value Tq are calculated based on the driver requirements such as accelerator pedal opening or the like, and the rotational speed NM is read.

In step S32, phase θ (present phase) is checked to confirm whether it is greater than the phase θh (required phase) or not. If the determined result in step 32 is "YES" (present phase>required phase), the process proceeds to step S33; if the determined result is "NO" (present phase≦required phase), the process proceeds to step S34. In step S32, by comparing the magnitude of the phase θ and the phase θh, whether the direction of the phase change is from the advance angle side to the lag angle side, or from the lag angle side to the advance angle side is determined.

Figure 9:
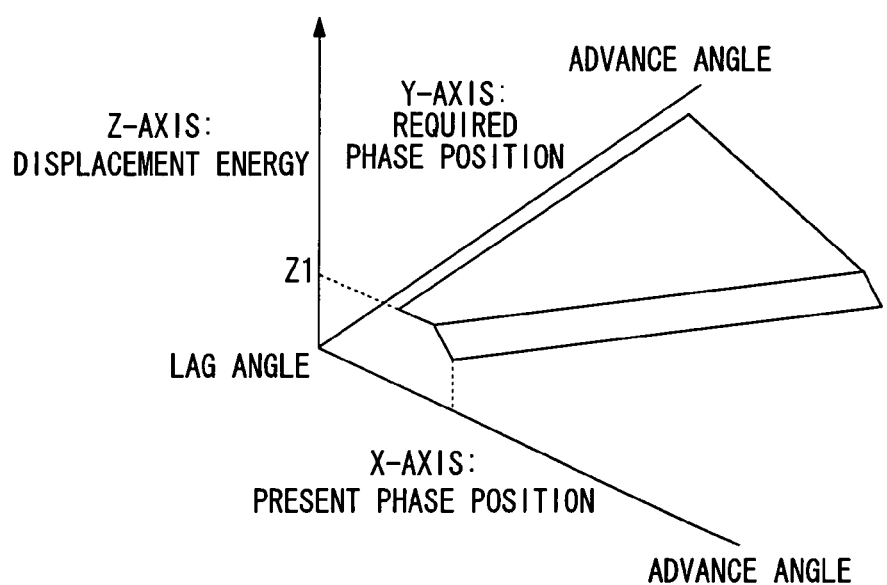
FIG. 9 is a map expressing the relationship between present phase, required phase and displacement energy, when the present phase is less or equal to the required phase, according to the present embodiment.

In step S33, the map of the present phase position (X axis), the required phase position (Y axis) and the displacement energy (Z axis) shown in FIG. 9 is retrieved based on the required phase position calculated in step S31 and the phase θ read in step S30, the displacement energy related to the phase change is determined, and this process is terminated.

Figure 10:
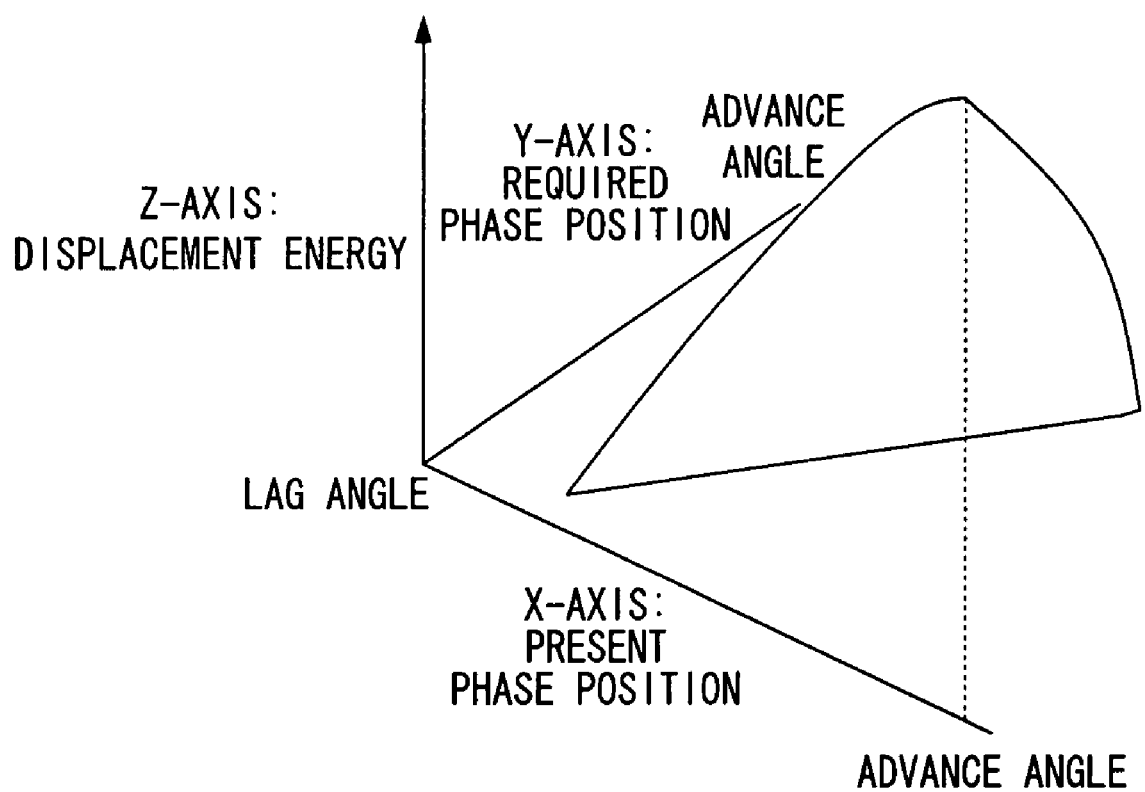
FIG. 10 is a map expressing the relationship between present phase, required phase and displacement energy when the present phase is greater than the required phase, according to the present embodiment.

In step S34, similar to step S33, the map of the present phase position (X axis), the required phase position (Y axis) and the displacement energy (Z axis) shown in FIG. 10 is retrieved based on the required phase position calculated in step S31 and the phase θ read in step S30, the displacement energy related to the phase change is determined, and this process is terminated.

Here, in the steps S32 to S34 mentioned above, when making a change in the phase position from the present phase to the required phase, the map of FIG. 9 and the map of FIG. 10 are appropriately interchanged according to the direction of displacement (advance angle side or lag angle side). As shown in the map of FIG. 9, if the present phase is larger than the required phase, that is, if the phase is changed from the advance angle side to the lag angle side, the unlike magnetic poles of the permanent magnet 21a of the rotor at the inner periphery 21 and the permanent magnet 22a of the rotor at the outer periphery 22 move in a direction such that they face each other. As a result, an attractive force acts on these permanent magnets 21a, 22a; thus, there is no need to set up additional hydraulic pressure by the phase control apparatus 25, and the displacement energy remains constant at the minimum value Z1. On the other hand, as shown in FIG. 10, when the present phase is less or equal to the required phase, the phase position changes in a direction opposite to that in the case when present phase is larger than the required phase, therefore, a torque to resist the attractive force on the permanent magnets 21a, 22a becomes necessary; thus, the larger the phase position changes, the more the displacement energy increases.

That is, when changing over from the drive mode driven by the motor 11 to the drive mode driven only by the internal combustion engine 12, the map shown in FIG. 7 is referred to first, and if the present phase position of the motor 11 is not within the possible phase range, the present phase position is changed so that it falls within the possible phase range. When the present phase position falls within the variable phase range, the reduced energy and the displacement energy related to the change in the phase position are calculated based on the maps of FIG. 8 to FIG. 10 respectively. If the energy difference ΔE required for changing the phase position, calculated by subtracting the displacement energy from this reduced energy, is greater than zero, that is, if the reduction in consumed energy can be achieved by changing the phase position, then the change in phase position is permitted. In all other cases, that is, when the consumed energy increases by changing the phase position or when there is no change in the consumed energy, the change in phase position is not permitted.

As described above, according to the motor control apparatus 10a of the present embodiment, when the drive mode driven by the motor 11 is changed over to the drive mode driven only by the internal combustion engine 12, the reduced energy that is produced when the phase position is changed from the phase θ to the phase θh is calculated by the reduced energy calculation process of step S07, and at the same time, the displacement energy that is produced when the phase θ is changed to the phase θh is calculated by the displacement energy calculation process of step S08, the reduced energy and the displacement energy are compared in step S10; only if the reduced energy is greater than the displacement energy (that is, if the consumed energy can be reduced when the phase position is changed), the change in phase position is permitted; therefore, the consumed energy during standby of the motor 11 can be restricted, and as a result, fuel economy in vehicle 10 can be achieved.

The present invention is not limited by the embodiment described above. For instance, the configuration may be such that using the map of the induced voltage constant Ke instead of the phase position, each energy value may be determined.

While a preferred embodiment of the invention has been described and illustrated above, it should be understood that this is an exemplary of the invention and is not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A motor control apparatus provided in a hybrid vehicle that has a motor and a phase changing device, and is driven by at least the motor or an internal combustion engine, the motor including a plurality of rotors each having a magnet piece, and the phase changing device changing a relative phase of each of the rotors by a fluid pressure of a working fluid, the motor control apparatus comprising:

a displacement mechanism phase calculation unit is configured to calculate a reduced energy that is produced when a drive mode of the hybrid vehicle is shifted from a drive mode driven by the motor to a drive mode driven only by the internal combustion engine and if the phase of the motor is changed from a present phase to an arbitrary required phase, calculate a displacement energy that is produced when the present phase is changed to the arbitrary required phase, and compare the reduced energy and the displacement energy, and permits changing from the present phase to the required phase when it is determined that the reduced energy is greater than the displacement energy.

2. The motor control apparatus according to claim 1, wherein the displacement mechanism phase calculation unit, calculates the reduced energy based on a difference between a maintenance energy required for maintaining the phase of the motor in the current phase and a maintenance energy required for maintaining the phase of the motor in the arbitrary required phase.

* * * * *